US012604082B2

(12) United States Patent
Jeon et al.

(10) Patent No.: US 12,604,082 B2
(45) Date of Patent: Apr. 14, 2026

(54) ELECTRONIC DEVICE CAPABLE OF ADJUSTING ANGLE OF VIEW AND OPERATING METHOD THEREFOR

(71) Applicant: Samsung Electronics Co., Ltd.,
Suwon-si (KR)

(72) Inventors: Jaehee Jeon, Suwon-si (KR); Bosung Kim, Suwon-si (KR); Sungoh Kim, Suwon-si (KR); Jiyoon Park, Suwon-si (KR); Byungho Ahn, Suwon-si (KR); Bohee Lee, Suwon-si (KR)

(73) Assignee: Samsung Electronics Co., Ltd.,
Suwon-si (KR)

(*) Notice: Subject to any disclaimer, the term of this patent is extended or adjusted under 35 U.S.C. 154(b) by 139 days.

(21) Appl. No.: 18/349,398

(22) Filed: Jul. 10, 2023

(65) Prior Publication Data

US 2023/0353863 A1 Nov. 2, 2023

Related U.S. Application Data

(63) Continuation of application No. PCT/KR2021/002316, filed on Feb. 24, 2021.

(30) Foreign Application Priority Data

Jan. 13, 2021 (KR) ........................ 10-2021-0004887

(51) Int. Cl.
*H04N 23/63* (2023.01)
*H04N 23/62* (2023.01)
*H04N 23/69* (2023.01)

(52) U.S. Cl.
CPC ........... *H04N 23/632* (2023.01); *H04N 23/62* (2023.01); *H04N 23/69* (2023.01)

(58) Field of Classification Search
CPC ...... H04N 23/632; H04N 23/62; H04N 23/69; H04N 23/635; H04N 23/6812;
(Continued)

(56) References Cited

U.S. PATENT DOCUMENTS 10,451,856 B2    10/2019 Lee
10,574,895 B2    2/2020 Lee et al.
(Continued)

FOREIGN PATENT DOCUMENTS

EP        4 199 496 A1    6/2023
JP        2004252370 A  *  9/2004    ............... G02B 7/08
(Continued)

OTHER PUBLICATIONS

Extended European Search Report dated May 15, 2024 for EP Application No. 21919793.6.
(Continued)

*Primary Examiner* — Christopher K Peterson
(74) *Attorney, Agent, or Firm* — Nixon & Vanderhye P.C.

(57) ABSTRACT

An electronic device example embodiment may include: a camera; a display; and at least one processor electrically connected to the camera and the display. The at least one processor may drive the camera so as to obtain an image, display, on the display, a first preview image for at least a partial area of the image on the basis of a magnification set to a magnification greater than or equal to a reference magnification, activate an angle-of-view fixing function for fixing the angle of view of the camera to a first angle of view corresponding to the first preview image, obtain a user input for changing from the first angle of view to a second angle of view while the angle-of-view fixing function is activated, and in response to obtaining the user input, display, on the display, a second preview image corresponding to the second angle of view in the image.

20 Claims, 13 Drawing Sheets

(58) Field of Classification Search
CPC .. H04N 23/683; H04N 23/687; H04N 23/631;
G06F 3/0346; G06F 3/0481; G06F
3/04815; G06F 3/04845; G06F 3/0488;
G06F 3/04883; G06F 2203/0381; G06F
2203/04806; H04M 1/72448; H04M
2250/52; H04M 1/0264; H04M 1/0266;
H04M 2250/12
See application file for complete search history.

(56)                References Cited

U.S. PATENT DOCUMENTS

| | | | |
|---|---|---|---|
| 2011/0043662 | A1 | 2/2011 | Kim |
| 2013/0088519 | A1 | 4/2013 | Cristescu et al. |
| 2013/0329062 | A1 | 12/2013 | Zhou et al. |
| 2014/0347627 | A1 | 11/2014 | Imamura |
| 2017/0325907 | A1 | 11/2017 | Maeda et al. |
| 2018/0167558 | A1* | 6/2018 | Hirai ..................... G09G 5/377 |
| 2018/0198982 | A1* | 7/2018 | Lee ..................... H04N 23/632 |
| 2019/0215462 | A1 | 7/2019 | Tsubusaki |
| 2019/0265448 | A1 | 8/2019 | Ogawa et al. |
| 2019/0387171 | A1 | 12/2019 | Juang et al. |
| 2019/0391731 | A1* | 12/2019 | Adler ................. G06F 3/04847 |
| 2020/0225504 | A1* | 7/2020 | Uchida ................. H04N 23/69 |

FOREIGN PATENT DOCUMENTS

| | | |
|---|---|---|
| JP | 5671856 B2 | 1/2015 |
| JP | 2016115965 A | 6/2016 |
| JP | 5984878 B2 | 8/2016 |
| JP | 6220268 B2 | 10/2017 |
| JP | 6364613 B2 | 7/2018 |
| JP | 2019148759 A | 9/2019 |
| KR | 20000055191 A | 9/2000 |
| KR | 20110020522 A | 3/2011 |
| KR | 101068656 B1 | 9/2011 |
| KR | 101622599 B1 | 5/2016 |
| KR | 20170020069 A | 2/2017 |
| KR | 101736728 B1 | 5/2017 |
| KR | 20170133748 A | 12/2017 |
| KR | 20180027191 A | 3/2018 |
| KR | 20180081362 A | 7/2018 |
| KR | 20220023632 A | 3/2022 |

OTHER PUBLICATIONS

Korean Office Action dated Jul. 31, 2025 for KR Application No. 10-2021-0004887.
Extended European Search Report dated Feb. 10, 2026 for EP Application No. 25213384.8.
Korean Notice of Patent Grant dated Feb. 27, 2026 for KR Application No. 10-2021-0004887.

* cited by examiner

412

FIRST PREVIEW IMAGE (401)

410

422

SECOND PREVIEW IMAGE (402)

420

FIRST DIRECTION
(501)

UI (520)

ELECTRONIC DEVICE CAPABLE OF ADJUSTING ANGLE OF VIEW AND OPERATING METHOD THEREFOR

CROSS-REFERENCE TO RELATED APPLICATIONS

This application is a continuation of International Application No. PCT/KR2021/002316 filed on Feb. 24, 2021, designating the United States, and claiming priority to Korean Patent Application No. 10-2021-0004887, filed Jan. 13, 2021, in the Korean Intellectual Property Office, the disclosures of all of which are hereby incorporated by reference herein in their entireties.

BACKGROUND

Field

Various example embodiments relate to an electronic device capable of adjusting an angle of view.

Description of Related Art

As a zoom magnification supported by electronic devices increases, there is a demand for improvement of shake correction performance in camera functions. A shake correction method may include optical image stabilization (OIS) and video digital image stabilization (VDIS). The optical image stabilization method is a method of reducing shake by moving a lens or an image sensor, and the digital image stabilization method is a method of reducing shake through digital processing.

The electronic device can provide a preview image having a substantially fixed field of view (FOV) (or angle of view (AOV) by performing shake correction in a high magnification environment of greater than or equal to a reference magnification. The electronic device can provide a stable preview screen to a user through the shake correction.

According to the prior art, it can be difficult to change an angle of view by a user input while an electronic device provides a substantially fixed angle of view in a high magnification environment.

SUMMARY

An electronic device of an example embodiment may include a camera, a display, and at least one processor electrically connected, directly or indirectly, to the camera and the display. The at least one processor may be configured to acquire an image by driving the camera, display a first preview image for at least a partial area of the image on the display, based on a magnification set greater than or equal to a reference magnification, activate a zoom lock function for fixing an angle of view of the camera to a first angle of view corresponding to the first preview image, acquire a user input for changing from the first angle of view to a second angle of view in a state where the zoom lock function is activated, and in response to acquiring the user input, display a second preview image corresponding to the second angle of view in the image on the display.

An operating method of an electronic device of an example embodiment may include the operations of acquiring an image by driving a camera included in the electronic device, displaying a first preview image for at least a partial area of the image on a display included in the electronic device, based on a magnification set greater than or equal to a reference magnification, activating a zoom lock function for fixing an angle of view of the camera to a first angle of view corresponding to the first preview image, acquiring a user input for changing from the first angle of view to a second angle of view in a state where the zoom lock function is activated, and in response to acquiring the user input, displaying a second preview image corresponding to the second angle of view in the image on the display.

According to various example embodiments, an electronic device may change an angle of view, based on a user input, while correcting shake in a high magnification environment.

According to various example embodiments, an electronic device may distinguish between user's unintentional shaking and user's intended movement. The electronic device need not apply shake correction to a motion within an image that is generated when a user intentionally moves the electronic device so as to change an angle of view.

Effects obtainable from various example embodiments are not limited to the effects mentioned above, and other effects not mentioned may be clearly understood by those skilled in the art to which various example embodiments pertain from the description below.

BRIEF DESCRIPTION OF DRAWINGS

The above and other aspects, features and advantages of certain embodiments will be more apparent from the following detailed description, taken in conjunction with the accompanying drawings, in which.

DETAILED DESCRIPTION

Figure 1:
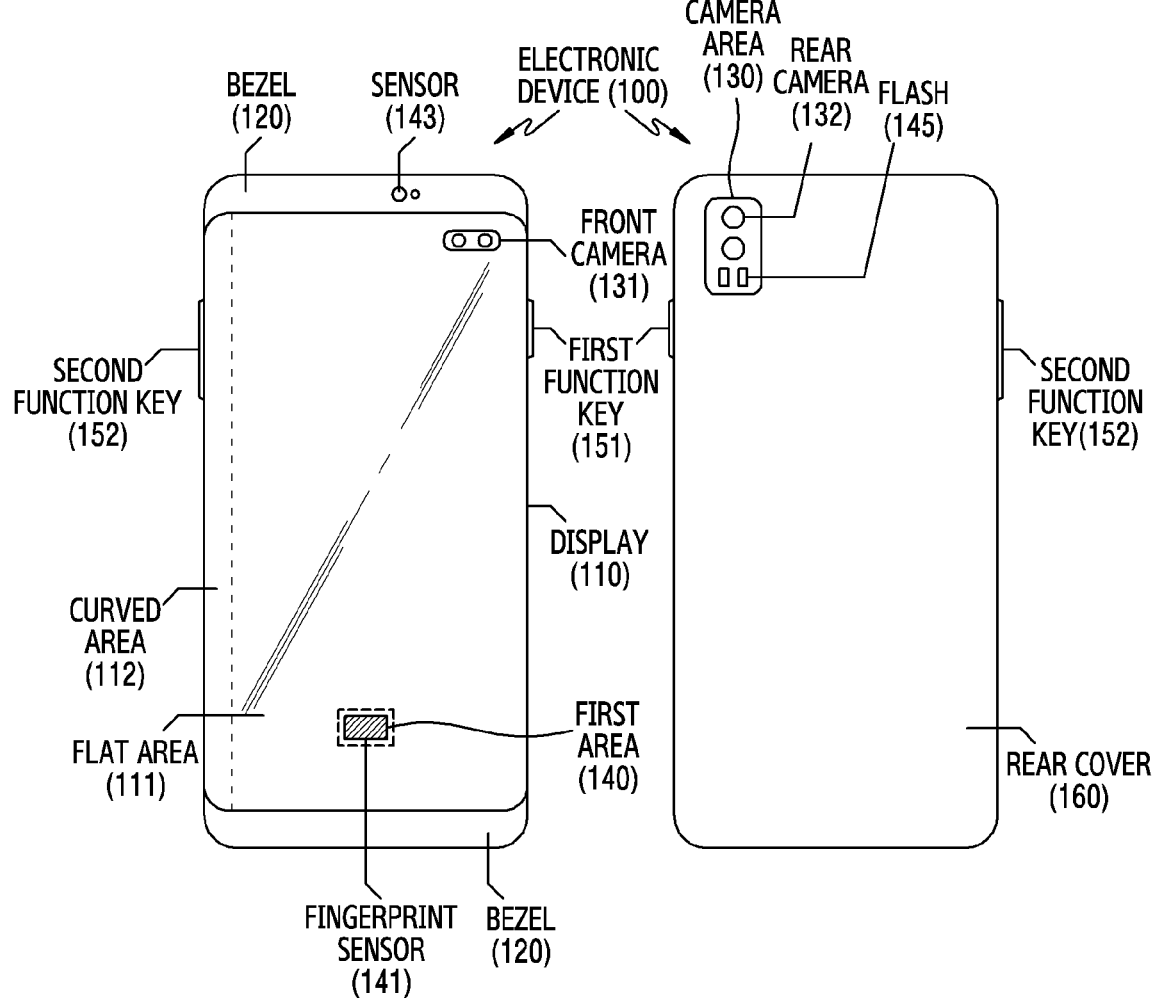
FIG. 1 illustrates an electronic device according to an example embodiment.

FIG. 1 illustrates an electronic device 100 according to an embodiment.

Referring to FIG. 1, a display 110 may be disposed on a front surface of the electronic device 100 (e.g., an electronic device 1001 of FIG. 10) according to an embodiment. In an embodiment, the display 110 may occupy most of the front surface of the electronic device 100. The display 110, and a bezel 120 area surrounding at least some edges of the display 110, may be disposed on the front surface of the electronic device 100. In the example of FIG. 1, the display 110 may include a flat area 111, and a curved area 112 extending from the flat area 111 toward a side surface of the electronic device 100. Although the curved area 112 is shown only on one side (e.g., the left side) in FIG. 1, it may be understood that a curved area is formed on an opposite side as well. Also, the illustrated electronic device 100 of FIG. 1 is one example, and various embodiments are possible. For example, the display 110 of the electronic device 100 may include only the flat area 111 without the curved area 112, or may include the curved area 112 only on an edge of one side rather than both sides. Also, in an embodiment, the curved area may extend to a rear surface of the electronic device 100 and thus, the electronic device 100 may include an additional flat area as well.

In an embodiment, a fingerprint sensor 141 for recognizing a user's fingerprint may be included in a first area 140 of the display 110. Since the fingerprint sensor 141 is disposed on a lower layer of the display 110, the fingerprint sensor 141 may be disposed not to be recognized by a user or to be difficult to be recognized, but is not limited thereto. In addition to the fingerprint sensor 141, a sensor for additional user/biometric authentication may be disposed in a partial area of the display 110. In another embodiment, a sensor for user/biometric authentication may be disposed in one area of the bezel 120. For example, an infrared (IR) sensor for iris authentication may be exposed through one area of the display 110, or be exposed through one area of the bezel 120.

In an embodiment, a sensor 143 may be included in at least one area of the bezel 120 of the electronic device 100 or at least one area of the display 110. The sensor 143 may be a sensor for distance detection and/or a sensor for object detection. The sensor 143 may be disposed at a distance adjacent, directly or indirectly, to a camera module (e.g., a front camera 131 and a rear camera 132), or be formed as one module with the camera module. For example, the sensor 143 may operate as at least a part of an IR camera (e.g., a time of flight (TOF) camera or a structured light camera), or operate as at least a part of a sensor module.

In an embodiment, the front camera 131 may be disposed on the front surface of the electronic device 100. In the embodiment of FIG. 1, the front camera 131 is shown as being exposed through one area of the display 110, but in another embodiment, the front camera 131 may be exposed through the bezel 120.

In an embodiment, the display 110 may include at least one of the sensor module, the camera module (e.g., the front camera 131 and/or the rear camera 132), and a light emitting device (e.g., LED), on a rear surface of a screen display area (e.g., the flat area 111 or the curved area 112).

In an embodiment, the camera module may be disposed on a back surface of at least one of a front surface, a side surface, and/or a rear surface of the electronic device 100, to face the front surface, the side surface, and/or the rear surface. For example, the front camera 131 may not be visually exposed as a screen display area (e.g., the flat area 111 and the curved area 112), and may include an under display camera (UDC) hidden. In an embodiment, the electronic device 100 may include one or more front cameras 131. For example, the electronic device 100 may include two front cameras such as a first front camera and a second front camera. In an embodiment, the first front camera and the second front camera may be cameras of the same type having the same specification (e.g., pixel), but the first front camera and the second front camera may be implemented as cameras having different specifications. The electronic device 100 may support dual-camera-related functions (e.g., 3D shooting, auto focus) through the two front cameras.

In an embodiment, the rear camera 132 may be disposed on the rear surface of the electronic device 100. The rear camera 132 may be exposed through a camera area 130 of a rear cover 160. In an embodiment, the electronic device 100 may include a plurality of rear cameras disposed in the camera area 130. For example, the electronic device 100 may include two or more rear cameras. For example, the electronic device 100 may include a first rear camera, a second rear camera, and a third rear camera. The first rear camera, the second rear camera, and the third rear camera may have different specifications. For example, the first rear camera, the second rear camera, and/or the third rear camera may be different in FOV, pixel, aperture, whether optical zoom/digital zoom is supported, whether an image stabilization function is supported, and type and/or arrangement of a set of lenses included in each camera. For example, the first rear camera may be a general camera, the second rear camera may be a camera for wide shooting (e.g., a wide-angle camera), and the third rear camera may be a camera for telescopic shooting through a high magnification. In embodiments of the present document, a description of the function or characteristics of the front camera may be applied to the rear camera, and vice versa.

In an embodiment, various kinds of hardware or sensors that assist shooting, such as a flash 145, may be additionally disposed in the camera area 130. For example, a distance sensor for detecting a distance between a subject and the electronic device 100 may be further included.

In an embodiment, the distance sensor may be disposed at a distance adjacent to the camera module (e.g., the front camera 131 and the rear camera 132) or be formed as one module with the camera module. For example, the distance sensor may operate as at least a part of the IR camera (e.g., a time of flight (TOF) camera and a structured light camera) or operate as at least a part of a sensor module. For example, the TOF camera may be operated as at least a part of the sensor module for detecting a distance to a subject.

In an embodiment, at least one physical key may be disposed on a side surface part of the electronic device 100. For example, a first function key 151 for turning on/off the display 110 or turning on/off the power of the electronic device 100 may be disposed on a right edge of the electronic device 100 with a criterion of the front surface of the electronic device 100. In an embodiment, a second function key 152 for controlling a volume or screen brightness of the electronic device 100 may be disposed on a left edge with a criterion of the front surface of the electronic device 100. In addition to this, an additional button or key may be disposed on the front surface or rear surface of the electronic device 100. For example, a physical button or touch button mapped to a specific function may be disposed in a lower area of the bezel 120 of the front surface.

The electronic device 100 shown in FIG. 1 corresponds to one example, and does not limit the form of the device to which various embodiments included in the present document are applied. For example, although the electronic device 100 of the illustrated example shows a bar-type or plate-type appearance, various embodiments of the present document are not limited thereto. For example, the illustrated electronic device may be part of a rollable electronic device. The rollable electronic device may be understood as an electronic device in which at least a portion thereof may be wound or rolled or be accommodated inside the electronic device 100 since the bending or deforming of the display 110 is possible. The rollable electronic device may expand and use a screen display area (e.g., the flat area 111 and the curved area 112) by unfolding the display 110 or exposing a larger area of the display 110 to the outside according to user's needs. The display 110 may also be referred to as a slide-out display or an expandable display.

Hereinafter, for convenience of description, various embodiments will be described with a criterion of the electronic device 100 shown in FIG. 1.

Figure 2:
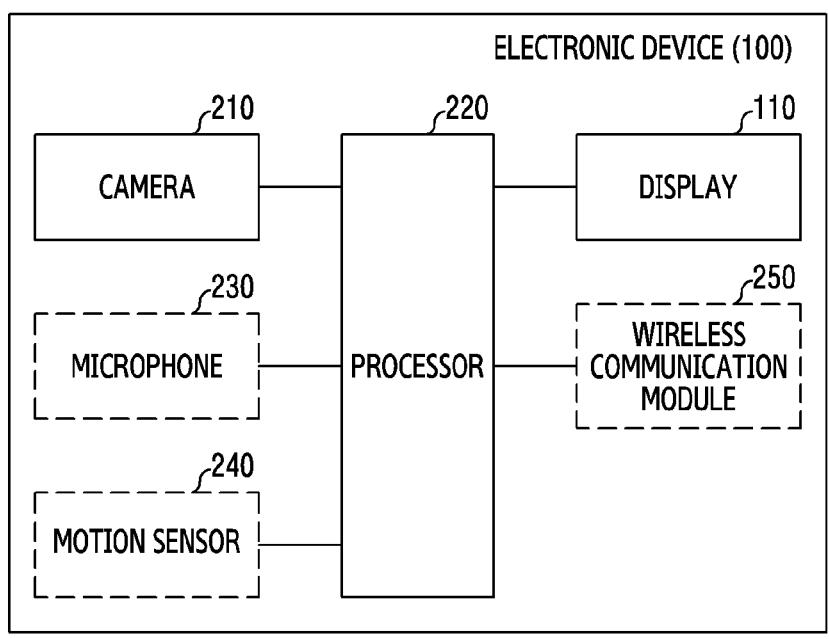
FIG. 2 is a block diagram illustrating a hardware construction of an electronic device according to an example embodiment.

FIG. 2 is a block diagram illustrating a hardware construction of an electronic device 100 according to an embodiment.

Figure 10:
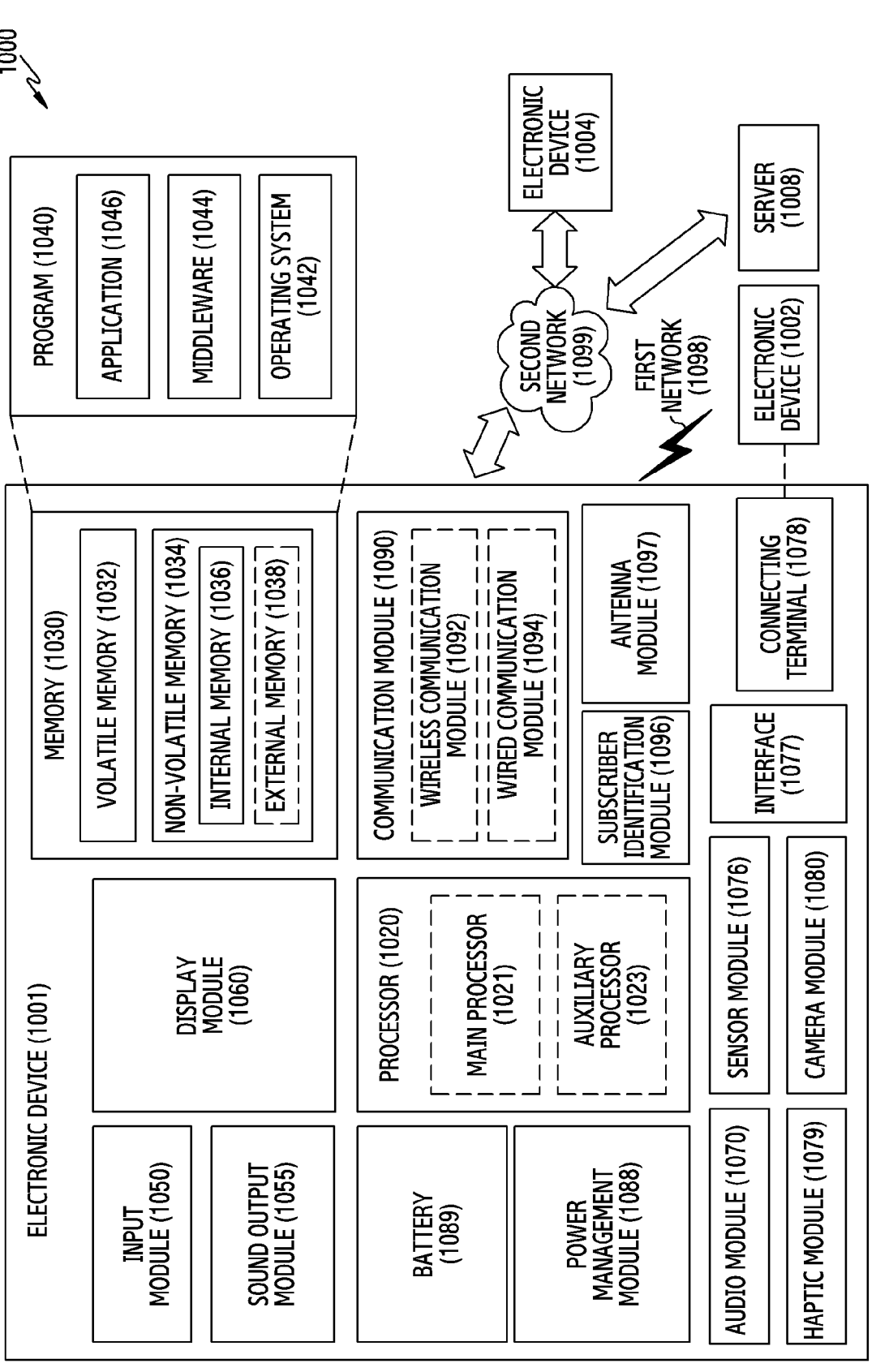
FIG. 10 is a block diagram of an electronic device in a network environment according to various example embodiments.

Referring to FIG. 2, the electronic device 100 (e.g., the electronic device 1001 of FIG. 10) may include a camera 210 (e.g., a camera module 1080 of FIG. 10), a processor 220 (e.g., a processor 1020 of FIG. 10)), and a display 110 (e.g., a display module 1060 of FIG. 10). In an embodiment, the camera 210 may be understood as at least one of the front camera 131 or the rear camera 132 shown in FIG. 1. In an embodiment, the electronic device 100 may further include at least one of a microphone 230, a motion sensor 240, or a wireless communication module 250.

According to an embodiment, the camera 210 may acquire an image. The camera 210 may be a camera 210 that supports optical zoom and/or digital zoom. The processor 220 may display a preview image for at least a partial area of the image, on the display 110, based on a set magnification. The processor 220 may perform shake correction (e.g., VDIS) for the at least partial area within a margin of the image.

According to an embodiment, an execution screen of an application (e.g., a camera application, a gallery application) executed by the processor 220 may be displayed on the display 110. In an embodiment, the processor 220 may display an image acquired through the camera 210 or a preview image corresponding to at least a partial area of the image, on the display 110.

According to an embodiment, the display 110 may be integrally implemented with a touch panel. The display 110 may support a touch function, and may detect a user input (e.g., a touch using a finger), and may deliver the user input to the processor 220. The display 110 may be connected, directly or indirectly, to a display driver integrated circuit (DDIC) for driving the display 110, and the touch panel may be connected, directly or indirectly, to a touch IC that detects a touch coordinate and processes a touch-related algorithm. In an embodiment, the display driving circuit and the touch IC may be integrally formed. In another embodiment, the display driving circuit and the touch IC may be formed separately. The display driving circuit and/or the touch IC may be electrically connected, directly or indirectly, to the processor 220.

According to an embodiment, the processor 220 may be understood as including at least one processor. For example, the processor 220 may include at least one of an application processor (AP), an image signal processor (ISP), and a communication processor (CP).

According to an embodiment, the processor 220 may perform an angle-of-view fixing function (zoom lock function), based on a magnification set greater than or equal to a reference magnification for the camera 210. At this time, the zoom lock function refers to at least one of functions capable of being provided by the electronic device 100, and is not limited to the term. According to an embodiment, the reference magnification may correspond to a previously specified magnification. For example, the reference magnification may correspond to 20 times. When a magnification of the entire image acquired by the processor 220 through the camera 210 is 1×, the reference magnification may be 20×.

According to an embodiment, the processor 220 may acquire a user's angle-of-view fixing input for a preview image, in a state of displaying on the display 110 the preview image for at least a partial area of an image acquired through the camera 210. The angle-of-view fixing input may be understood as a zoom lock trigger or an FOV fixing trigger.

In an embodiment, the angle-of-view fixing input may include a user's display 110 touch input acquired by the processor 220, a user's button input, or a user's voice input. In an embodiment, the angle-of-view fixing input may be referred to as an angle-of-view fixing event. For example, detecting a specified object within the image by the processor 220 may correspond to the occurrence of the angle-of-view fixing event. Even if a user's touch input, button input, or voice input is not acquired, the processor 220 may determine that the angle-of-view fixing input has been acquired when detecting a specified object within the image. In an embodiment, when the zoom lock function is specified in advance as a basic setting, the processor 220 may activate the zoom lock function even if there is not the angle-of-view fixing input. For example, in response to a set magnification being greater than or equal to a reference magnification, the processor 220 may also activate the zoom lock function.

In an embodiment, the processor 220 may increase a strength of shake correction (e.g., VDIS), in response to acquiring the angle-of-view fixing input/event. For example, the processor 220 may perform shake correction even for a shake of a range smaller than a range of shake corrected before increasing the strength of shake correction. According to an embodiment, a motion vector corresponding to a range in which the electronic device 100 is shaken and a correction vector value in which the processor 220 performs shake correction may have the same magnitude and opposite directions. According to an embodiment, the processor 220 may display a preview image for which shake correction is performed on the display 110. For example, the processor 220 may perform shake correction for a shake of the electronic device 100 (e.g., user's hand shaking), and display a preview image in which a position and size of a subject are kept constant on the display 110.

According to an embodiment, the processor 220 may display a UI indicating whether the zoom lock function is activated on the display 110. For example, the processor 220 may be display the UI on at least a partial area of a camera application screen displayed on the display 110. The processor 220 may display whether the zoom lock function is activated through the UI while the camera application is being executed. According to an embodiment, the processor

220 may acquire an angle-of-view fixing input (e.g., a touch input) of a user through the UI.

According to an embodiment, the processor 220 may acquire a user input for changing an angle of view of the camera 210 in a state where the zoom lock function is activated. According to an embodiment, the state where the zoom lock function is activated may be understood as not only a state where the angle of view has been fixed, but also a state where the angle-of-view fixing is being performed according to the angle-of-view fixing input. According to an embodiment, the user input for changing the angle of view may include a user's voice input acquired by the processor 220 through the microphone 230, a touch input acquired through the display 110, and a movement of the electronic device 100 detected through the motion sensor 240. The processor 220 may display a preview image corresponding to the changed angle of view on the display 110, in response to acquiring the user input. When acquiring the user input for changing the angle of view, the processor 220 may change the angle of view in a state where the zoom lock function is activated. For example, when a user moves (e.g., movement intended by the user) the electronic device 100 in order to change the angle of view in a state where the zoom lock function is activated, the processor 220 may determine that the movement is not an object of shake correction but a user input for changing the angle of view.

According to an embodiment, the electronic device 100 may further include the microphone 230. The processor 220 may acquire a user's voice input through the microphone 230. For example, the processor 220 may acquire a user's voice input such as "move to the left" and "zoom in", and may determine an instruction corresponding to the user's voice input through a voice recognition algorithm such as artificial intelligence (AI). When acquiring the voice input, the processor 220 may change an angle of view, and display a preview image corresponding to the changed angle of view on the display 110.

According to an embodiment, the electronic device 100 may further include the motion sensor 240. The processor 220 may detect the movement of the electronic device 100 through the motion sensor 240. In an embodiment, the motion sensor 240 may include an acceleration sensor, a gyro sensor (gyroscope), a magnetic sensor, or a Hall sensor. In an embodiment, the acceleration sensor is a sensor configured to measure acceleration acting on three axes (e.g., X-axis, Y-axis, or Z-axis) of the electronic device 100, and may measure, estimate, and/or detect the force applied to the electronic device 100 by using the measured acceleration. However, the above sensors are exemplary, and the motion sensor may further include at least one other type of sensor.

According to an embodiment, the processor 220 may determine whether the electronic device 100 moves in a predetermined direction for a reference time or longer, based on motion data acquired through the motion sensor 240. According to an embodiment, the processor 220 may detect a movement pattern or a movement distance of the electronic device 100, based on the motion data. For example, the processor 220 may determine whether the electronic device 100 moves similarly to a specified pattern at a predetermined ratio or more. For another example, the processor 220 may determine whether the electronic device 100 moves a specified distance or more.

According to an embodiment, the electronic device 100 may further include the wireless communication module 250. The wireless communication module 250 may communicate with an external electronic device (not shown) or a digital pen (e.g., a stylus pen) through a network (e.g., a short-distance communication network such as Bluetooth or wireless fidelity (WiFi) direct). For example, the processor 220 may acquire an input for changing an angle of view by using a digital pen, through the wireless communication module 250.

Figure 3:
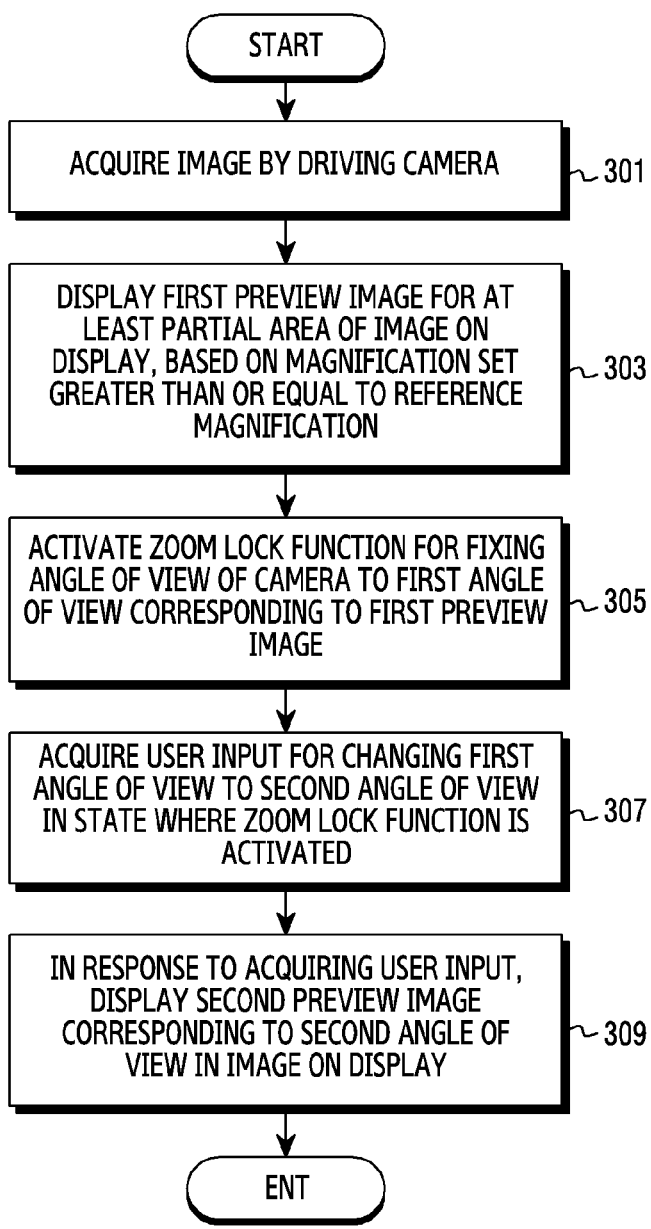
FIG. 3 is a flowchart illustrating an operation in which an electronic device changes an angle of view in a state where a zoom lock function is activated according to an example embodiment.

FIG. 3 is a flowchart illustrating an operation in which the electronic device 100 changes an angle of view in a state where a zoom lock function is activated according to an embodiment. Operations described in FIG. 3 may be performed by the processor 220 of the electronic device 100 shown in FIG. 2.

According to an embodiment, in operation 301, the processor 220 may acquire an image by driving the camera 210.

According to an embodiment, the processor 220 may execute an application that uses the camera 210. For example, the processor 220 may acquire a user input for executing a camera application. The user input may include at least one of touching an icon of the camera application, clicking a first function key 151 or a second function key 152, or inputting a voice such as "turn on the camera" or "run the camera" through voice recognition. The processor 220 may execute the camera application in response to at least one of the user inputs.

In an embodiment, the processor 220 may drive the camera 210 by executing the camera application. The processor 220 may acquire image data through an image sensor in the camera 210 by driving the camera 210. The image data may include various color values acquired through a color filter array. For example, the color filter array may include a color filter array of at least one of a red, green, blue, emerald (RGBE) pattern, a cyan, yellow, magenta (CYYM) pattern, a cyan, yellow, green, magenta (CYGM) pattern, or a red, green, blue, white (RGBW) pattern.

According to an embodiment, in operation 303, the processor 220 may display a first preview image for at least a partial area of the image on the display 110, based on a magnification set greater than or equal to a reference magnification.

According to an embodiment, the processor 220 may display on the display 110 a first preview image acquired by cropping at least a partial area of the image acquired through the camera 210. For example, the processor 220 may crop at least a partial area of the acquired image, based on the set magnification.

According to an embodiment, in operation 305, the processor 220 may activate a zoom lock function for fixing an angle of view of the camera 210 to a first angle of view corresponding to the first preview image.

According to an embodiment, the processor 220 may activate the zoom lock function for fixing the angle of view of the camera 210 to the first angle of view in a state of displaying the first preview image on the display 110. For example, the processor 220 may increase a strength of shake correction, in response to acquiring an angle-of-view fixing input (e.g., a zoom lock trigger) of a user. The processor 220 may correct a shake of the electronic device 100 (e.g., user's hand shaking) and display the first preview image for which the angle of view is fixed to the first angle of view on the display 110.

According to an embodiment, in operation 307, the processor 220 may acquire a user input for changing from the first angle of view to a second angle of view in a state where the zoom lock function is activated.

According to an embodiment, the user input may include a user's voice input acquired by the processor 220 through the microphone 230, a user's touch input acquired through the display 110, and a specific movement of the electronic device 100 acquired through the motion sensor 240.

According to an embodiment, the processor 220 may acquire a user's voice input through the microphone 230. For example, the processor 220 may acquire a user's voice input such as "move to the left" and "zoom out" through AI voice recognition. The processor 220 may determine that the voice input is a user input for changing from a first angle of view to a second angle of view.

According to an embodiment, the processor 220 may acquire a user's touch input through the display 110. For example, the user's touch input may include drag and drop. The processor 220 may determine that the touch input is a user input for changing from the first angle of view to the second angle of view.

According to an embodiment, the processor 220 may display a user interface (UI) on the display 110 in a state where the zoom lock function is activated. For example, the processor 220 may display the UI in the form of a jog button on the display 110. When acquiring a touch input for the UI through the display 110, the processor 220 may determine that the touch input is a user input for changing from the first angle of view to the second angle of view.

According to an embodiment, when detecting the movement of the electronic device 100 through the motion sensor 240, and detecting that the electronic device 100 moves in a predetermined direction for a reference time or longer, the processor 220 may determine that the user input has been acquired. For example, the processor 220 may detect that the electronic device 100 moves in a predetermined direction for a reference time (e.g., 3 seconds) or longer through the motion sensor 240. When the movement is detected, the processor 220 may determine that the user input has been acquired. In an embodiment, when the processor 220 detects that the electronic device 100 moves in a state where the zoom lock function is activated, the processor 220 may determine a movement less than the reference time as an object of shake correction (e.g., VDIS), and may determine a movement equal to or greater than the reference time as the acquisition of the user input for changing from the first angle of view to the second angle of view.

According to an embodiment, the processor 220 may detect a movement pattern or a movement distance of the electronic device 100 through the motion sensor 240. For example, the processor 220 may determine that the user input has been acquired, in response to determining that the electronic device 100 moves similarly to a specified pattern at a predetermined ratio or more. For another example, the processor 220 may also determine that the user input has been acquired, in response to determining that the electronic device 100 moves a specified distance or more.

According to an embodiment, the processor 220 may acquire a user input that uses an external electronic device or a digital pen through the wireless communication module 250. For example, the processor 220 may acquire data about at least some of a movement direction, a movement distance, and a movement speed of the digital pen through the wireless communication module 250, and may determine that the user input for changing from the first angle of view to the second angle of view has been acquired, based on the data.

According to an embodiment, the processor 220 may acquire a user input through at least two of the voice input, the touch input, the user input through the movement, and the user input through the wireless communication module 250. For example, the processor 220 may acquire the voice input acquired through the microphone 230 and the touch input through the display 110, together.

According to an embodiment, the user input for changing from the first angle of view to the second angle of view may include at least one of a user input for moving a position of an angle of view and a user input for changing a set magnification. In an embodiment, the user input for moving the position of the angle of view may include a user input for moving a position of a subject included in a first preview image. In an embodiment, the user input for changing the set magnification may include a user input for changing a size of a subject included in the first preview image.

According to an embodiment, when a magnification of a second preview image becomes lower than a reference magnification according to a user input for changing a set magnification, the processor 220 may inactivate the zoom lock function. For example, the processor 220 may activate the zoom lock function, based on a magnification that is set higher than or equal to the reference magnification, and thus may inactivate the zoom lock function when the set magnification is lower than the reference magnification.

According to an embodiment, in operation 309, in response to acquiring the user input, the processor 220 may display a second preview image corresponding to the second angle of view in the image on the display 110.

According to an embodiment, in response to acquiring the user input, the processor 220 may change the angle of view of the camera 210 from the first angle of view to the second angle of view, without inactivating the zoom lock function. The processor 220 may change the angle of view of the camera 210 while performing shake correction (e.g., VDIS).

According to an embodiment, the first preview image and the second preview image in the image acquired through the camera 210 may correspond to different areas. In an embodiment, positions of an area corresponding to the first preview image and an area corresponding to the second preview image may be different from each other within the image. For example, when comparing a first point corresponding to the center of the first preview image and a second point corresponding to the center of the second preview image within the image, positions of the first point and the second point may be different from each other. In an embodiment, a size of the area corresponding to the first preview image and a size of the area corresponding to the second preview image in the image may be different from each other.

Figure 4:
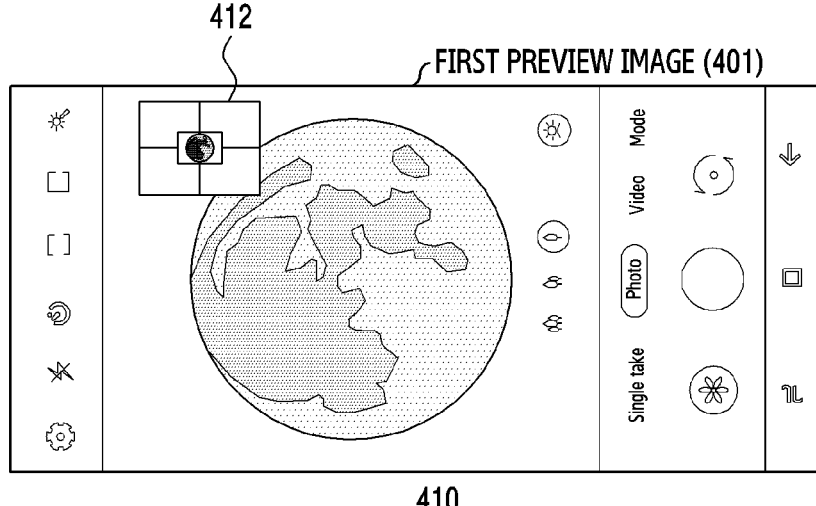
FIG. 4 illustrates an example of a first preview image and a second preview image displayed on a display according to an example embodiment.
Figure 4:
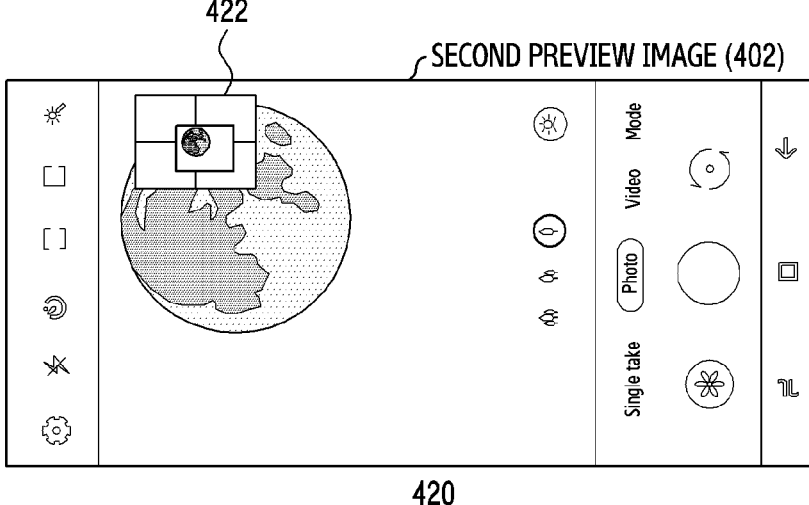

FIG. 4 illustrates an example of a first preview image 401 and a second preview image 402 displayed on the display 110 according to an embodiment.

Various embodiments of FIG. 4 are described with reference to at least one component included in the electronic device 100 of FIG. 2.

Referring to FIG. 4, reference number 410 shows an example of an execution screen of a camera application when the first preview image 401 is displayed on the display 110. According to an embodiment, the processor 220 may acquire an image by driving the camera 210, and display the first preview image 401 for at least a partial area of the image on the display 110, based on a magnification set greater than or equal to a reference magnification.

According to an embodiment, the processor 220 may activate a zoom lock function for fixing an angle of view of the camera 210 to a first angle of view corresponding to the first preview image 401. For example, the processor 220 may activate the zoom lock function for fixing the angle of view of the camera 210 to the first angle of view in which a subject (e.g., the moon) is located at the center of the first preview image 401.

Referring to FIG. 4, reference number 420 shows an example of an execution screen of a camera application when a second preview image 402 is displayed on the display 110. According to an embodiment, the processor 220 may display the second preview image 402 corresponding to a second angle of view in the image on the display 110, in response to acquiring a user input for changing the angle of view from the first angle of view to the second angle of view in a state where the zoom lock function is activated. In an embodiment, the user input acquired by the processor 220 may include a user input for moving a position of an angle of view and a user input for changing a set magnification. For example, the processor 220 may move the position of the angle of view wherein the subject (e.g., the moon) included in the first preview image 401 moves a predetermined distance in an −x-axis direction and a predetermined distance in a +y-axis direction. For another example, the processor 220 may change the set magnification wherein a size of the subject (e.g., the moon) included in the first preview image 401 is decreased.

According to an embodiment, the processor 220 may display UIs 412 and 422 on at least some areas of the camera application execution screens 410 and 420. The processor 220 may show the location and size of an area corresponding to the first preview image 401 in the image acquired through the camera 210 through the UI 412, and may show the location and size of an area corresponding to the second preview image 402 in the image through the UI 422. For example, the processor 220 may show a cropped area of the image through the UIs 412 and 422. The UI 412 may be referred to, or referred to as, a zoom map.

In an embodiment, the processor 220 may display the zoom map on the display 110 at a predetermined zoom magnification or higher. For example, the processor 220 does not display the zoom map at a first zoom magnification (e.g., xl zoom magnification), but the processor 220 may display the zoom map on the display 110 when acquiring a zoom input equal to or greater than a second zoom magnification (e.g., ×10 zoom magnification).

In an embodiment, the processor 220 may display the zoom map, based on an optical zoom input and a digital zoom input. For example, after acquiring image data of a predetermined zoom magnification through optical zoom, the processor 220 may crop at least a part of an image of the predetermined zoom magnification when acquiring a user's zoom-in input. The processor 220 may present, through the zoom map, information on a ratio of an area where the at least part is cropped to the image data of the predetermined zoom magnification. For example, when the ratio is 1/10, the processor 220 may display the zoom map as cropped area/ zoom map area=1/10.

In an embodiment, the processor 220 may adjust a size of the cropped area displayed on the zoom map, based on the zoom magnification. For example, when it is a first magnification (e.g., maximum or high zoom magnification), the processor 220 may display the size of the cropped area displayed on the zoom map, as a first size (e.g., minimum or small size). When a magnification (e.g., second magnification) is smaller than the first magnification (e.g., maximum or high zoom magnification), the processor 220 may display the cropped area displayed on the zoom map, at a size (e.g., a second size) magnified more than the first size (e.g., minimum or small size).

Figure 5A:
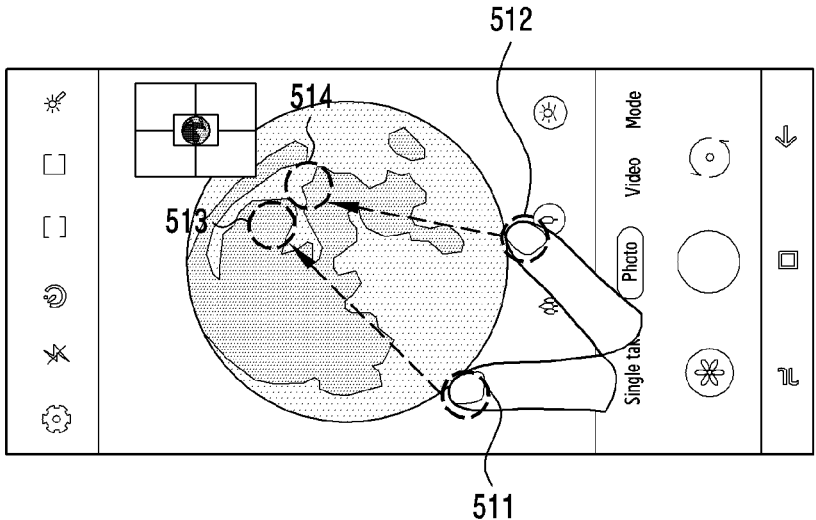
FIG. 5A illustrates an example of a user's touch input for changing an angle of view according to an example embodiment.
Figure 5B:
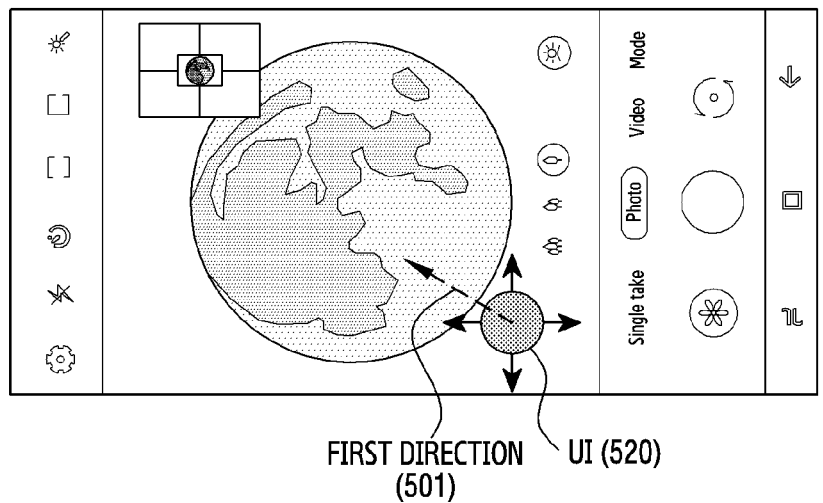
FIG. 5B illustrates an example of a user input through a user interface (UI) displayed on a display according to an example embodiment.
Figure 5C:
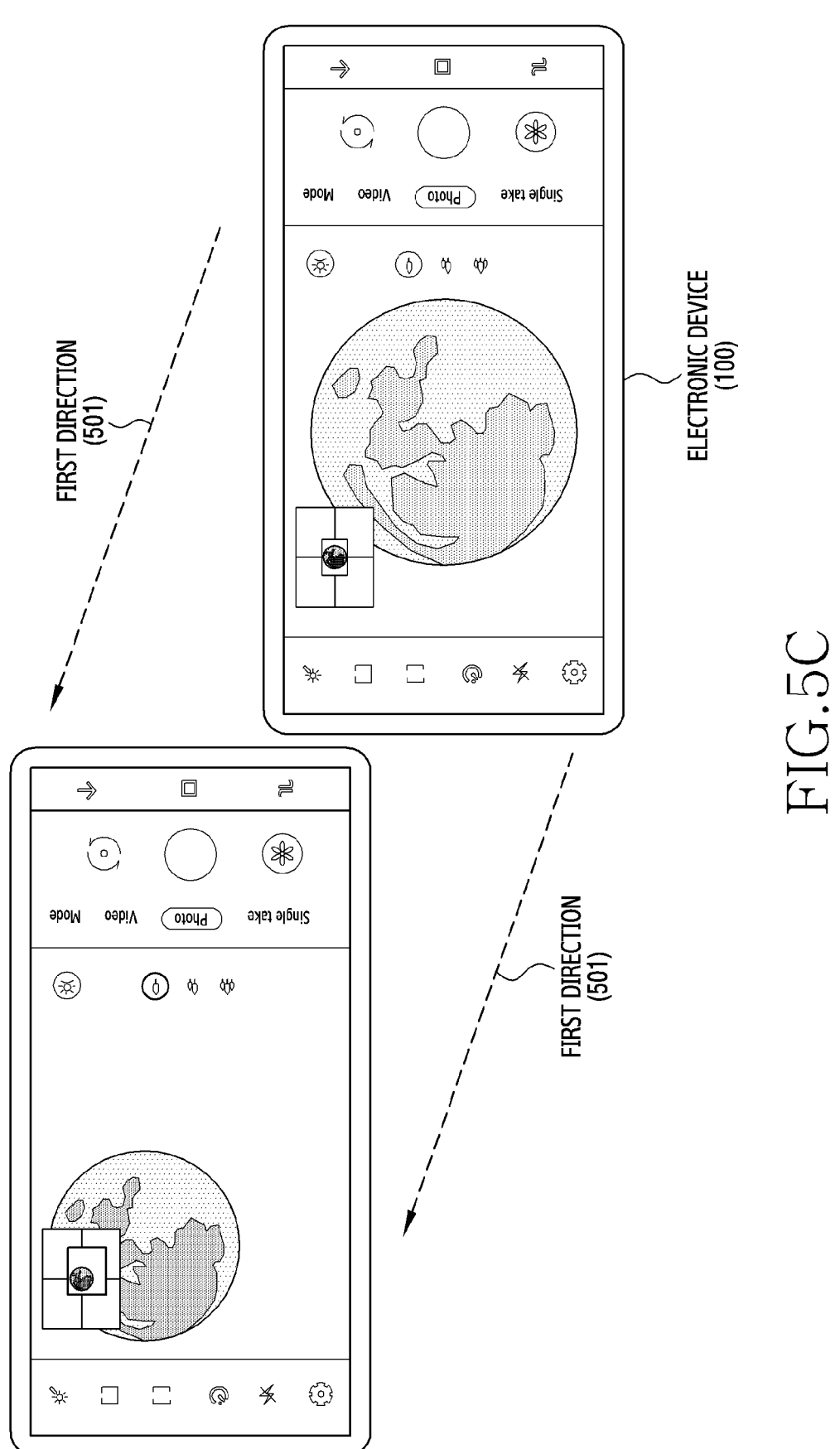
FIG. 5C illustrates an example of a user input through the movement of an electronic device according to an example embodiment.
Figure 6:
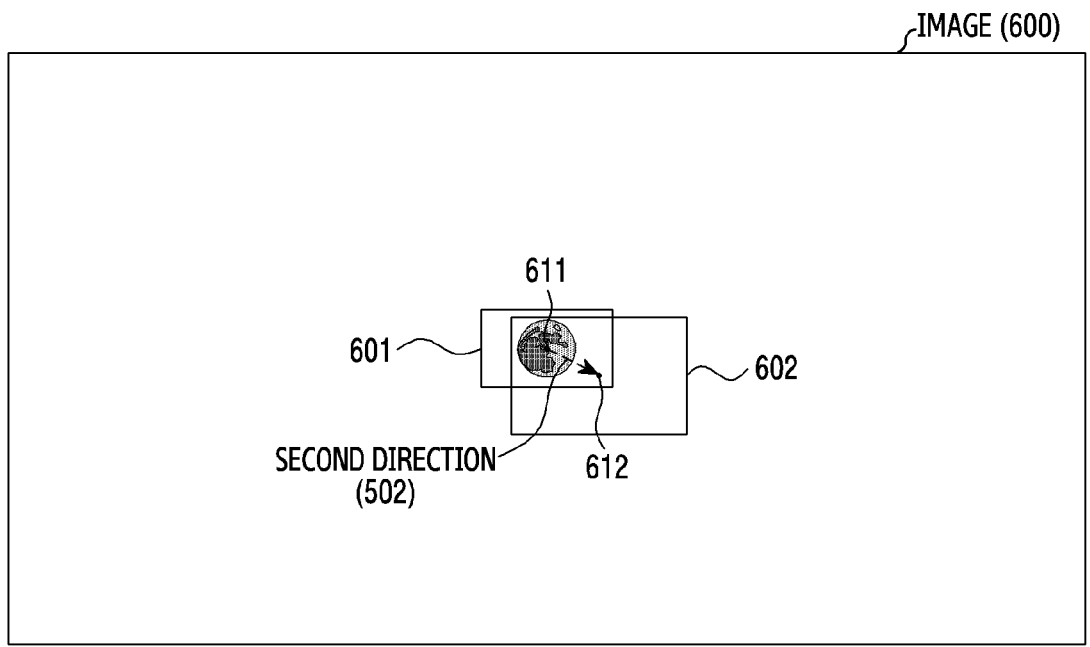
FIG. 6 illustrates positions and sizes of an area corresponding to a first preview image and an area corresponding to a second preview image in an image acquired through a camera according to an example embodiment.

In an embodiment, the zoom maps illustrated in FIGS. 4 to 6 show that an object appearing in a preview image is displayed, but the processor 220 may show the cropped area without displaying the object on the zoom map.

According to an embodiment, the UIs 412 and 422 shown in FIG. 4 may be also understood as UIs displaying whether the zoom lock function is activated. For example, the processor 220 may display the zoom map in yellow in a state where the zoom lock function is activated. The processor 220 may display the zoom map in yellow even while changing an angle of view in a state where the zoom lock function is activated. For another example, the processor 220 may display the zoom map in white in a state where the zoom lock function is inactivated. The processor 220 may display the zoom map in white, when the zoom lock function is inactivated according as a set magnification is changed. According to an embodiment, the processor 220 may also acquire an angle-of-view fixing input through the UIs 412 and 422. According to an embodiment, the processor 220 may display an additional UI adjacent to the zoom map on the display 110 in a state where a predetermined condition capable of activating the zoom lock function is satisfied. For example, the processor 220 may display a palm-shaped UI adjacently to the zoom map when the set magnification is greater than or is equal to a reference magnification.

FIG. 5A illustrates an example of a user's touch input for changing an angle of view according to an embodiment.

Various embodiments of FIG. 5A are described with reference to at least one component included in the electronic device 100 of FIG. 2.

According to an embodiment, the processor 220 may receive a user's touch input for changing from a first angle of view to a second angle of view, in a state where a zoom lock function for fixing an angle of view of the camera 210 to the first angle of view is activated. The processor 220 may receive the user's touch input through the display 110. For example, the user's touch input through the display 110 may include drag and drop.

According to an embodiment, the processor 220 may acquire a touch input to a first area 511 and a second area 512 of the display 110. The processor 220 may acquire an input of dragging and dropping from the first area 511 to a third area 513, and may acquire an input of dragging and dropping from the second area 512 to a fourth area 514. The processor 220 may determine the acquired touch input as a user input for changing the angle of view of the camera 210. The first area 511, the second area 512, the third area 513, and the fourth area 514 shown in FIG. 5A are one example showing an arbitrary area where a user's touch input is possible rather than an area displayed on the display 110, and the embodiments of the present document are not limited thereto.

According to an embodiment, when receiving the touch input, the processor 220 may determine that a user input for moving a position of an angle of view and a user input for changing a set magnification have been acquired. For example, when a center point of the first area 511 and the second area 512 and a center point of the third area 513 and the fourth area 514 do not coincide, the processor 220 may determine that a user input for changing a position of an angle of view has been acquired. Also, when a distance between the first area 511 and the second area 512 and a distance between the third area 513 and the fourth area 514 do not coincide, the processor 220 may determine that a user input for changing a set magnification has been acquired.

FIG. 5B illustrates an example of a user input through a UI 520 displayed on a display 110 according to an embodiment.

Various embodiments of FIG. 5B are described with reference to at least one component included in the electronic device 100 of FIG. 2.

According to an embodiment, the processor 220 may receive a user's touch input for changing from a first angle of view to a second angle of view, in a state where a zoom lock function for fixing an angle of view of the camera 210 to the first angle of view is activated. In an embodiment, the processor 220 may display the UI 520 on the display 110 in a state where the zoom lock function is activated, and may acquire a user's touch input through the UI 520. For example, the processor 220 may display the UI 520 in the form of a jog button on the display 110.

According to an embodiment, the processor 220 may acquire a user's touch input to the UI 520 displayed on the display 110. For example, the processor 220 may receive a touch input for dragging and dropping the UI 520 in a first direction 501.

According to an embodiment, when receiving the touch input, the processor 220 may determine that a user input for moving a position of an angle of view has been acquired. For example, when receiving a user input for dragging and dropping the UI 520 in the first direction 501, the processor 220 may determine that a user input for moving a subject (e.g., the moon) included in the first preview image 401 in one direction 501 has been acquired.

According to an embodiment, while acquiring a user input for moving a position of an angle of view through the touch input, the processor 220 may also acquire a user input for changing a set magnification through a separate user input. For example, the processor 220 may acquire a user input for changing the angle of view through a voice input through the microphone 230, together with the touch input.

FIG. 5C illustrates an example of a user input through a movement of the electronic device 100 according to an embodiment.

Various embodiments of FIG. 5C are described with reference to at least one component included in the electronic device 100 of FIG. 2.

According to an embodiment, the processor 220 may receive a user input for changing from a first angle of view to a second angle of view, in a state where a zoom lock function for fixing an angle of view of the camera 210 to the first angle of view is activated. The processor 220 may detect a motion of the electronic device 100 through a motion sensor 240, and when detecting that the electronic device 100 moves in a predetermined direction for a reference time or longer, the processor 220 may determine that the user input has been acquired.

According to an embodiment, the processor 220 may detect that the electronic device 100 moves in the first direction 501 for a reference time (e.g., 3 seconds) or longer through the motion sensor 240. When detecting the movement, the processor 220 may determine that a user input for moving a position of an angle of view has been acquired. For example, the processor 220 may determine that the user input is a user input for moving a subject (e.g., the moon) included in the first preview image 401 in the first direction 501.

According to an embodiment, while acquiring a user input for moving a position of an angle of view through the motion sensor 240, the processor 220 may also acquire a user input for changing a set magnification through a separate user input. For example, the processor 220 may acquire a user input for changing the angle of view through a voice input through the microphone 230, together with the user input through the movement of the electronic device 100.

FIG. 6 illustrates positions and sizes of an area 601 corresponding to a first preview image 401 and an area 602 corresponding to a second preview image 402 in an image 600 acquired through a camera 210 according to an embodiment.

FIG. 6 illustrates an example of the area 601 corresponding to the first preview image 401 and the area 602 corresponding to the second preview image 402, which are at least some areas of the image 600 acquired by the processor 220 through the camera 210. Reference number 611 denotes a first point corresponding to the center of the first preview image 401, and reference number 612 denotes a second point corresponding to the center of the second preview image 402.

According to an embodiment, the processor 220 may display the first preview image 401 for at least a partial area 601 of the image 600 on the display 110, based on a magnification set greater than or equal to a reference magnification. The processor 220 may acquire a user input (e.g., a user input described in relation to FIGS. 5A, 5B, and 5C) for changing from a first angle of view to a second angle of view in a state of activating the zoom lock function to the first angle of view corresponding to the first preview image 401. In response to acquiring the user input, the processor 220 may display the second preview image 402 corresponding to the second angle of view in the image 600 on the display 110.

According to an embodiment, in relation to the contents described with reference to FIGS. 5A to 5C, a user input for changing from a first angle of view to a second angle of view may include a user input for moving a position of an angle of view in a first direction 501 and a user input for decreasing a set magnification. In an embodiment, comparing the area 601 corresponding to the first preview image 401 and the area 602 corresponding to the second preview image 402 within the image 600, the positions of the first point 611 and the second point 612 may be different from each other. When the processor 220 acquires a user input to move a position of an angle of view in the first direction 501, the processor 220 may change the angle of view wherein the second point 612 rather than the first point 611 is located in a second direction 502, which is a direction opposite to the first direction 501, within the image 600. In an embodiment, a size of the area 601 corresponding to the first preview image 401 and a size of the area 602 corresponding to the second preview image 402 within the image 600 may be different from each other. In response to receiving a user input for decreasing a set magnification, the processor 220 may change the angle of view wherein the size of the area 602 corresponding to the second preview image 402 is greater than the size of the area 601 corresponding to the first preview image 401.

According to an embodiment, since the processor 220 may determine different areas within the image 600 as preview images (e.g., the first preview image 401 and the second preview image 402), the processor 220 may change an angle of view of the camera 210 even when the electronic device 100 does not move. The processor 220 may change the angle of view by using a margin area not included in the area 601 corresponding to the first preview image 401 in the image 600 acquired through the camera 210. For example, in a state where the electronic device 100 is fixed in position and thus the image 600 is constantly acquired, the processor 220 may change the angle of view from the area 601 corresponding to the first preview image 401 to the area 602 corresponding to the second preview image 402. A user may be provided with preview images of various angles of view even without moving the electronic device 100.

Figure 7:
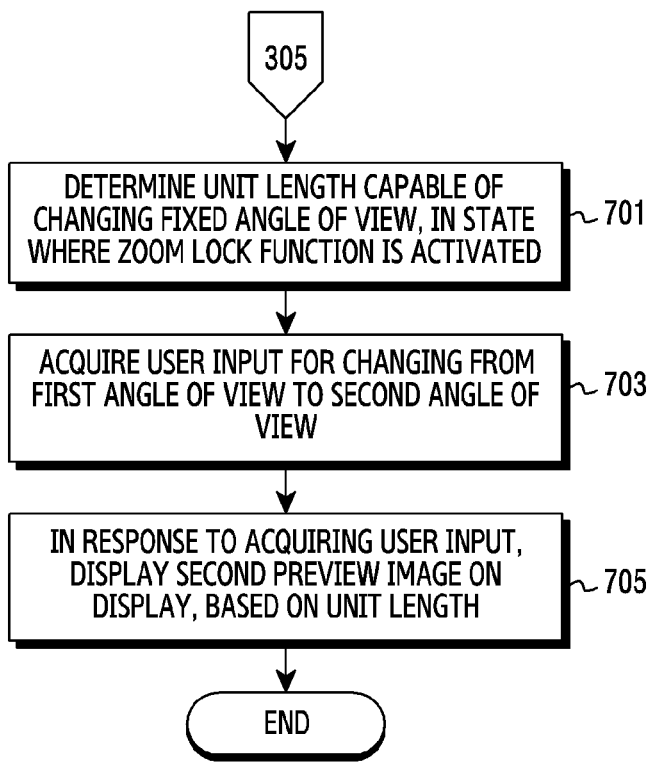
FIG. 7 is a flowchart illustrating an operation in which an electronic device determines a unit length, and changes an angle of view, based on the unit length according to an example embodiment.

FIG. 7 is a flowchart illustrating an operation in which the electronic device 100 determines a unit length and changes an angle of view, based on the unit length, according to an embodiment. Operations described in FIG. 7 may be performed by the processor 220 shown in FIG. 2.

According to an embodiment, in operation 701, the processor 220 may determine a unit length capable of changing a fixed angle of view, in a state where a zoom lock function is activated.

According to an embodiment, after activating the zoom lock function, the processor 220 may determine the unit length capable of changing the angle of view, before receiving a user input for changing the angle of view. For example, the unit length may be understood as a unit length in which an area corresponding to a first preview image (e.g., the area 601 corresponding to the first preview image of FIG. 6) may move within an image (e.g., the image 600 of FIG. 6).

According to an embodiment, the processor 220 may determine a margin length, based on a difference between an image acquired through the camera 210 and the first preview image, and determine the unit length, based on the margin length. In an embodiment, the margin length may be understood as a distance between the image and the area corresponding to the first preview image, with a criterion of a direction in which the area corresponding to the first preview image (e.g., the area 601 corresponding to the first preview image of FIG. 6) will move within the image (e.g., the image 600 of FIG. 6) acquired through the camera 210.

According to an embodiment, in operation 703, the processor 220 may acquire a user input for changing from a first angle of view to a second angle of view. Operation 703 may correspond to operation 307 shown in FIG. 3.

According to an embodiment, in operation 705, in response to acquiring the user input, the processor 220 may display a second preview image on the display 110, based on the unit length.

In an embodiment, when the processor 220 moves the area corresponding to the first preview image within the image in order to change the angle of view, the processor 220 may discontinuously move the area corresponding to the first preview image within the image, based on the determined unit length. For example, the processor 220 may move the area corresponding to the first preview image within the image, based on a length corresponding to a multiple of the unit length.

Figure 8:
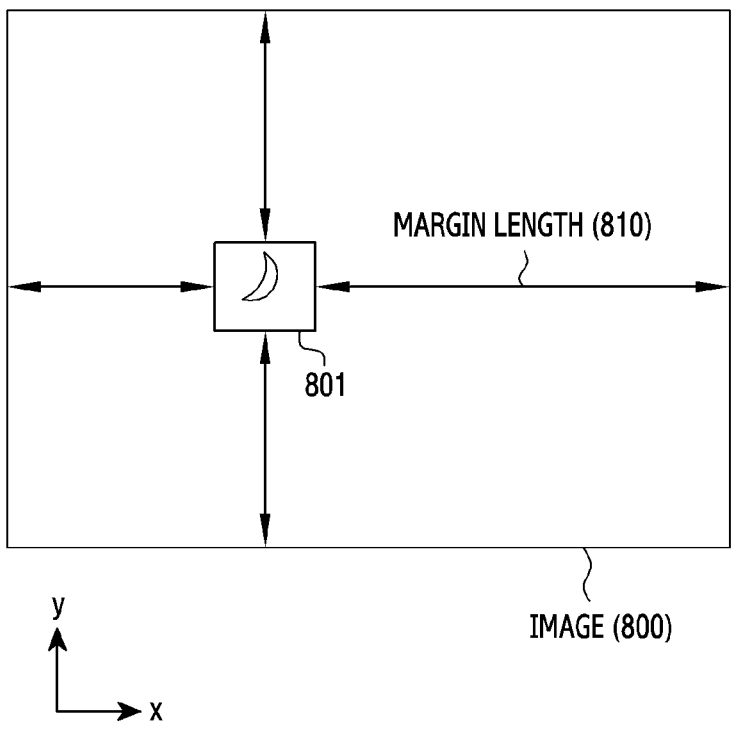
FIG. 8 illustrates a margin length according to an example embodiment.

FIG. 8 illustrates a margin length 810 according to an embodiment.

Referring to FIG. 8, the processor 220 may determine the margin length 810, based on a difference between an image 800 acquired through the camera 210 and an area 801 corresponding to a first preview image. In an embodiment, the margin length 810 may be understood as a distance between the image 800 and the area 801 corresponding to the first preview image with a criterion of a direction (e.g., +x-axis direction) in which the area 801 corresponding to the first preview image will move within the image 800. In an embodiment, in a state where a zoom lock function is activated, the processor 220 may determine the margin length 810 for at least one of +x-axis direction, −x-axis direction, +y-axis direction, and −y-axis direction, with a criterion of the area 801 corresponding to the first preview image. For example, the margin length 810 for the +x-axis direction may be understood as a distance between an +x-axis direction boundary of the image 800 and an +x-axis direction boundary of the area 801 corresponding to the first preview image. A description of the margin length 810 may be applied to the −x-axis direction, the +y-axis direction, the −y-axis direction, and other directions.

Figure 9:
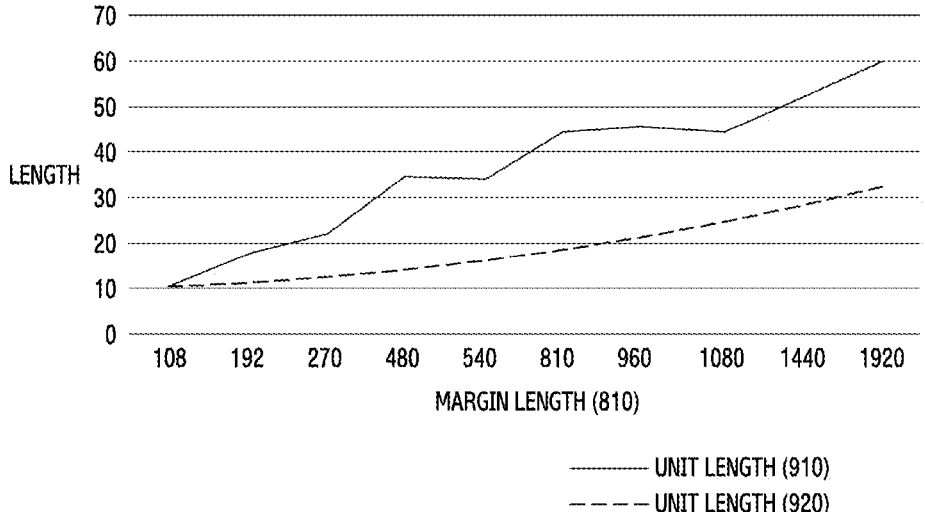
FIG. 9 illustrates a unit length dependent on a margin length according to an example embodiment.

FIG. 9 illustrates a unit length 910 dependent on a margin length 810 according to an embodiment.

A solid line graph of FIG. 9 shows an example in which the unit length 910 is determined according to the margin length 810 of an embodiment. In an embodiment, the processor 220 may determine the unit length 910, based on the margin length 810. For example, the processor 220 may set the unit length 910 wherein the unit length 910 increases as the margin length 810 increases. As the margin length 810 increases, a distance that the area 801 corresponding to the first preview image may move within the image 800 increases, so the unit length 910 that the area 801 corresponding to the first preview image may move may also increase. For another example, when the margin length 810 is included in a specific section, the processor 220 may set the unit length 910 wherein, even if the margin length 810 increases, the unit length 910 has a constant value or decreases.

A dotted line graph of FIG. 9 shows an example of a unit length 920 capable of varying according to a strength of shake correction, in a situation where the margin length 810 and the unit length 910 are determined and the strength of shake correction is varied according to an embodiment. In an embodiment, the unit length 920 at which the processor 220 moves the area 801 corresponding to the first preview image within the image 800 may vary according to the strength of shake correction. For example, the processor 220 may determine a correction value dependent on the strength of shake correction, and determine the unit length 920, based on the correction value.

According to an embodiment, Equation 1 describes a method of determining a correction value dependent on a strength of shake correction required to determine the unit length 920.

$$Correction value = \frac{maximum correction strength}{current correct in strength} \times margin ratio \qquad \text{[Equation 1]}$$

According to an embodiment, the processor 220 may determine a correction value through a ratio of a maximum or high correction strength to a current correction strength, and a margin ratio. The maximum correction strength may be understood as a strength at which the processor 220 may increase a strength of shake correction to the maximum or to a large extent, and the current correction strength may be understood as a strength of shake correction at the time of changing an angle of view. In an embodiment, the correction value may change as the strength of shake correction changes, and the unit length 920 may change as the correction value changes. For example, the unit length 920 may increase as the strength of shake correction increases.

According to an embodiment, Equation 2 describes a method of determining the margin ratio included in Equation 1.

$$margin ratio = \frac{length of\ correction margin}{margin length} \qquad \text{[Equation 2]}$$

According to an embodiment, the margin ratio may be understood as a ratio of a length of a correction margin to the margin length 810. The correction margin may be understood as a margin required for shake correction (e.g., VDIS).

In an embodiment, as a strength of shake correction increases, the length of the correction margin required for the shake correction may increase and accordingly, the margin ratio may increase.

FIG. 10 is a block diagram illustrating an electronic device 1001 in a network environment 1000 according to various embodiments.

Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some embodiments, at least one of the components (e.g., the connecting terminal 1078) may be omitted from the electronic device 1001, or one or more other components may be added in the electronic device 1001. In some embodiments, some of the components (e.g., the sensor module 1076, the camera module 1080, or the antenna module 1097) may be implemented as a single component (e.g., the display module 1060 comprising a display).

The processor 1020 may execute, for example, software (e.g., a program 1040) to control at least one other component (e.g., a hardware or software component) of the electronic device 1001 coupled (directly or indirectly) with the processor 1020, and may perform various data processing or computation. According to an embodiment, as at least part of the data processing or computation, the processor 1020 may store a command or data received from another component (e.g., the sensor module 1076 comprising a sensor, or the communication module 1090 comprising communication circuitry) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 comprising processing circuitry, or the sensor module 1076 comprising a sensor) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088, which may comprise circuitry, may manage power supplied to the electronic device 1001. According to an embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090, comprising communication circuitry, may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092, comprising communication circuitry, may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent (directly or indirectly) to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 11:
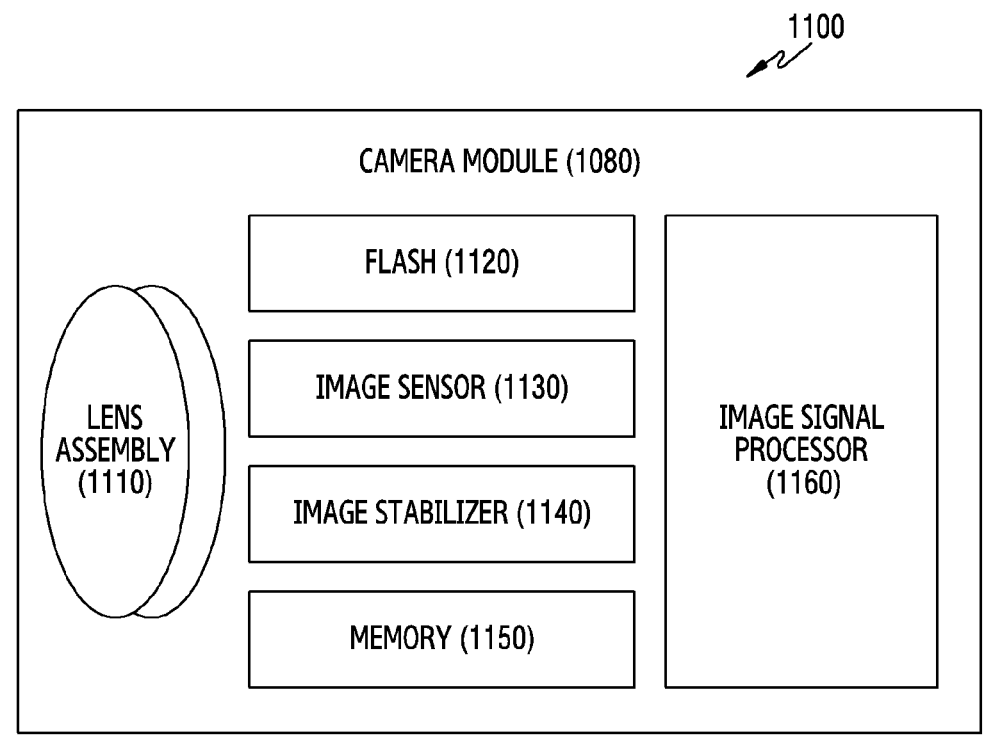
FIG. 11 is a block diagram illustrating a camera module according to various example embodiments.

FIG. 11 is a block diagram 1100 illustrating the camera module 1080 according to various embodiments.

Referring to FIG. 11, the camera module 1080 may include a lens assembly 1110, a flash 1120, an image sensor 1130, an image stabilizer 1140, memory 1150 (e.g., buffer memory), or an image signal processor 1160. The lens assembly 1110 may collect light emitted or reflected from an object whose image is to be taken. The lens assembly 1110 may include one or more lenses. According to an embodiment, the camera module 1080 may include a plurality of lens assemblies 1110. In such a case, the camera module 1080 may form, for example, a dual camera, a 360-degree camera, or a spherical camera. Some of the plurality of lens assemblies 1110 may have the same lens attribute (e.g., view angle, focal length, auto-focusing, f number, or optical zoom), or at least one lens assembly may have one or more lens attributes different from those of another lens assembly. The lens assembly 1110 may include, for example, a wide-angle lens or a telephoto lens.

The flash 1120 may emit light that is used to reinforce light reflected from an object. According to an embodiment, the flash 1120 may include one or more light emitting diodes (LEDs) (e.g., a red-green-blue (RGB) LED, a white LED, an infrared (IR) LED, or an ultraviolet (UV) LED) or a xenon lamp. The image sensor 1130 may obtain an image corresponding to an object by converting light emitted or reflected from the object and transmitted via the lens assembly 1110 into an electrical signal. According to an embodiment, the image sensor 1130 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1130 may be implemented using, for example, a charged coupled device (CCD) sensor or a complementary metal oxide semiconductor (CMOS) sensor.

The image stabilizer 1140 may move the image sensor 1130 or at least one lens included in the lens assembly 1110 in a particular direction, or control an operational attribute (e.g., adjust the read-out timing) of the image sensor 1130 in response to the movement of the camera module 1080 or the electronic device 1001 including the camera module 1080. This allows compensating for at least part of a negative effect (e.g., image blurring) by the movement on an image being captured. According to an embodiment, the image stabilizer 1140 may sense such a movement by the camera module 1080 or the electronic device 1001 using a gyro sensor (not shown) or an acceleration sensor (not shown) disposed inside or outside the camera module 1080. According to an embodiment, the image stabilizer 1140 may be implemented, for example, as an optical image stabilizer. The memory 1150 may store, at least temporarily, at least part of an image obtained via the image sensor 1130 for a subsequent image processing task. For example, if image capturing is delayed due to shutter lag or multiple images are quickly captured, a raw image obtained (e.g., a Bayer-patterned image, a high-resolution image) may be stored in the memory 1150, and its corresponding copy image (e.g., a low-resolution image) may be previewed via the display module 1060. Thereafter, if a specified condition is met (e.g., by a user's input or system command), at least part of the raw image stored in the memory 1150 may be obtained and processed, for example, by the image signal processor 1160. According to an embodiment, the memory 1150 may be configured as at least part of the memory 1030 or as a separate memory that is operated independently from the memory 1030.

The image signal processor 1160 may perform one or more image processing with respect to an image obtained via the image sensor 1130 or an image stored in the memory 1150. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1160 may perform control (e.g., exposure time control or read-out timing control) with respect to at least one (e.g., the image sensor 1130) of the components included in the camera module 1080. An image processed by the image signal processor 1160 may be stored back in the memory 1150 for further processing, or may be provided to an external component (e.g., the memory 1030, the display module 1060, the electronic device 1002, the electronic device 1004, or the server 1008) outside the camera module 1080. According to an embodiment, the image signal processor 1160 may be configured as at least part of the processor 1020, or as a separate processor that is operated independently from the processor 1020. If the image signal processor 1160 is configured as a separate processor from the processor 1020, at least one image processed by the image signal processor 1160 may be displayed, by the processor 1020, via the display module 1060 as it is or after being further processed.

According to an embodiment, the electronic device 1001 may include a plurality of camera modules 1080 having different attributes or functions. In such a case, at least one of the plurality of camera modules 1080 may form, for example, a wide-angle camera and at least another of the plurality of camera modules 1080 may form a telephoto camera. Similarly, at least one of the plurality of camera modules 1080 may form, for example, a front camera and at least another of the plurality of camera modules 1080 may form a rear camera.

An electronic device of an example embodiment may include a camera, a display, and at least one processor electrically connected, directly or indirectly, to the camera and the display. The at least one processor may acquire an image by driving the camera, display a first preview image for at least a partial area of the image on the display, based on a magnification set greater than or equal to a reference magnification, activate a zoom lock function for fixing an angle of view of the camera to a first angle of view corresponding to the first preview image, acquire a user input for changing from the first angle of view to a second angle of view in a state where the zoom lock function is activated, and in response to acquiring the user input, display a second preview image corresponding to the second angle of view in the image on the display.

The electronic device of an example embodiment may further include a microphone electrically connected, directly or indirectly, to the at least one processor. The user input may include a user's voice input acquired by the at least one processor through the microphone.

In the electronic device of an example embodiment, the user input may include a user's touch input acquired by the at least one processor through the display.

In the electronic device of an example embodiment, the at least one processor may display a user interface (UI) on the display in a state where the zoom lock function is activated, and the user input may include the user's touch input to the UI, acquired by the at least one processor.

The electronic device of an example embodiment may include a motion sensor electrically connected, directly or indirectly, to the at least one processor and capable of detecting a motion of the electronic device. The at least one processor may detect a motion of the electronic device through the motion sensor, and determine that the user input has been acquired, when detecting that the electronic device moves in a predetermined direction for a reference time or longer.

In the electronic device of an example embodiment, the first preview image and the second preview image may correspond to areas of different positions in the image.

In the electronic device of an example embodiment, the first preview image and the second preview image may correspond to areas of different sizes in the image.

In the electronic device of an example embodiment, the at least one processor may determine a unit length capable of changing the fixed angle of view, in a state where the zoom lock function is activated, and in response to acquiring the user input, display the second preview image on the display, based on the unit length.

In the electronic device of an example embodiment, the at least one processor may determine a margin length, based on a difference between the image and the first preview image, and determine the unit length, based on the margin length.

An operating method of an electronic device of an example embodiment may include the operations of acquiring an image by driving a camera included in the electronic device, displaying a first preview image for at least a partial area of the image on a display included in the electronic device, based on a magnification set greater than or equal to a reference magnification, activating a zoom lock function for fixing an angle of view of the camera to a first angle of view corresponding to the first preview image, acquiring a user input for changing from the first angle of view to a second angle of view in a state where the zoom lock function is activated, and in response to acquiring the user input, displaying a second preview image corresponding to the second angle of view in the image on the display.

In the operating method of the electronic device of an example embodiment, the operation of acquiring the user input may include the operation of acquiring a user's voice input through a microphone included in the electronic device.

In the operating method of the electronic device of an example embodiment, the operation of acquiring the user input may include the operation of acquiring a user's touch input through the display.

The operating method of the electronic device of an example embodiment may include the operation of detecting a movement of the electronic device through a motion sensor included in the electronic device, and the operation of acquiring the user input may include the operation of determining, through the motion sensor, that the electronic device moves in a predetermined direction for a reference time or longer.

The operating method of the electronic device of an example embodiment may include the operations of determining a unit length capable of changing the fixed angle of view in a state where the zoom lock function is activated, and in response to acquiring the user input, displaying the second preview image on the display, based on the unit length.

In the operating method of the electronic device of an example embodiment, the operation of determining the unit length may include the operations of determining a margin length, based on a difference between the image and the first preview image, and determining the unit length, based on the margin length.

An electronic device of an example embodiment may include a camera, a microphone, a display, and at least one processor electrically connected, directly or indirectly, to the camera, the microphone, and the display. The at least one processor may acquire an image by driving the camera, display a first preview image for at least a partial area of the image on the display, based on a magnification set greater than or equal to a reference magnification, activate a zoom lock function for fixing an angle of view of the camera to a first angle of view corresponding to the first preview image, acquire a user's voice input for changing from the first angle of view to a second angle of view through the microphone in a state where the zoom lock function is activated, and in response to acquiring the voice input, display a second preview image corresponding to the second angle of view in the image on the display.

In the electronic device of an example embodiment, the first preview image and the second preview image may correspond to areas of different positions in the image.

In the electronic device of an example embodiment, the first preview image and the second preview image may correspond to areas of different sizes in the image.

In the electronic device of an example embodiment, the at least one processor may determine a unit length capable of changing the fixed angle of view in a state where the zoom lock function is activated; and in response to acquiring the voice input, display the second preview image on the display, based on the unit length. "Based on" as used herein covers based at least on.

In the electronic device of an example embodiment, the at least one processor may determine a margin length, based on a difference between the image and the first preview image, and determine the unit length, based on the margin length.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a camera;
a display; and
at least one processor, comprising processing circuitry, electrically connected to the camera and the display,
wherein the at least one processor, individually and/or collectively, is configured to:
acquire an image via the camera;
display a first preview image for at least a partial area of the image on the display, based on a magnification set greater than or equal to a reference magnification;
activate a zoom lock function for fixing an angle of view of the camera to a first angle of view corresponding to the first preview image and for performing shake correction for a shake of the electronic device while the first preview image is displayed;
acquire a user input for changing from the first angle of view to a second angle of view in a state where the zoom lock function is activated; and
based on the acquire of the user input, control to display a second preview image corresponding to the second angle of view in the image on the display while performing the shake correction, wherein the first preview image and the second preview image correspond to areas of different positions in the image.

2. The electronic device of claim 1, further comprising a microphone electrically connected to the at least one processor,
wherein the user input comprises a user's voice input acquired by the at least one processor via the microphone.

3. The electronic device of claim 1, wherein the user input comprises a user's touch input acquired by the at least one processor via the display.

4. The electronic device of claim 3, wherein the at least one processor is configured to control to display a user interface (UI) on the display in a state where the zoom lock function is activated, and
wherein the user input comprises the user's touch input to the UI, acquired by the at least one processor.

5. The electronic device of claim 1, further comprising a motion sensor electrically connected to the at least one processor and configured for detecting a motion of the electronic device,
wherein the at least one processor is configured to:
detect a motion of the electronic device via the motion sensor; and
determine that the user input has been acquired, when detecting that the electronic device moves in a predetermined direction for a reference time or longer.

6. The electronic device of claim 1, wherein the user input for changing from the first angle of view to the second angle of view includes a user input for changing an angle of view and a user input for changing a set magnification, and the first preview image and the second preview image correspond to areas of different magnifications and positions in the image.

7. The electronic device of claim 1, wherein the first preview image and the second preview image correspond to areas of different sizes in the image.

8. The electronic device of claim 1, wherein the at least one processor is configured to:

determine a unit length capable of changing the fixed angle of view, in a state where the zoom lock function is activated; and
based on the acquire of the user input, control to display the second preview image on the display, based on the unit length.

9. The electronic device of claim 8, wherein the at least one processor is configured to:
determine a margin length, based on a difference between the image and the first preview image; and
determine the unit length, based on the margin length.

10. An operating method of an electronic device, the method comprising:
acquiring an image via a camera comprised in the electronic device;
displaying a first preview image for at least a partial area of the image on a display comprised in the electronic device, based on a magnification set greater than or equal to a reference magnification;
activating a zoom lock function for providing an angle of view of the camera to a first angle of view corresponding to the first preview image and for performing shake correction for a shake of the electronic device while the first preview image is displayed;
acquiring a user input for changing from the first angle of view to a second angle of view in a state where the zoom lock function is activated; and
based on the acquiring of the user input, displaying a second preview image corresponding to the second angle of view in the image on the display while performing the shake correction, wherein the first preview image and the second preview image correspond to areas of different positions in the image.

11. The operating method of the electronic device of claim 10, wherein the acquiring the user input comprises acquiring a user's voice input via a microphone of the electronic device.

12. The operating method of the electronic device of claim 10, wherein the acquiring the user input comprises acquiring a user's touch input via the display.

13. The operating method of the electronic device of claim 10, further comprising:
detecting a movement of the electronic device via a motion sensor of the electronic device,
wherein the acquiring of the user input comprises determining, via the motion sensor, that the electronic device moves in a predetermined direction for a reference time or longer.

14. The operating method of the electronic device of claim 10, further comprising:
determining a unit length capable of changing the angle of view in a state where the zoom lock function is activated; and
in response to acquiring the user input, displaying the second preview image on the display, based on the unit length.

15. The operating method of the electronic device of claim 14, wherein determining the unit length comprises:
determining a margin length, based on a difference between the image and the first preview image; and
determining the unit length, based on the margin length.

16. An electronic device comprising:
a camera;
a microphone;
a display; and at least one processor, comprising processing circuitry, electrically connected to the camera, the microphone, and the display, wherein the at least one processor, individually and/or collectively, is configured to:

acquire an image by driving the camera;

display a first preview image for at least a partial area of the image on the display, based on a magnification set greater than or equal to a reference magnification;

activate a zoom lock function for fixing an angle of view of the camera to a first angle of view corresponding to the first preview image and for performing shake correction for a shake of the electronic device while the first preview image is displayed;

acquire a user's voice input for changing from the first angle of view to a second angle of view through the microphone in a state where the zoom lock function is activated; and in response to acquiring the voice input, display a second preview image corresponding to the second angle of view in the image on the display while performing the shake correction, wherein the first preview image and the second preview image correspond to areas of different positions in the image.

17. The electronic device of claim 16, wherein the user's voice input for changing from the first angle of view to the second angle of view includes a user input for changing an angle of view and a user input for changing a set magnification, and the first preview image and the second preview image correspond to areas of different magnification and positions in the image.

18. The electronic device of claim 17, wherein the first preview image and the second preview image correspond to areas of different sizes in the image.

19. The electronic device of claim 16, wherein the at least one processor is configured to:

determine a unit length capable of changing the fixed angle of view in a state where the zoom lock function is activated; and in response to acquiring the voice input, display the second preview image on the display, based on the unit length.

20. The electronic device of claim 19, wherein the at least one processor is configured to:

determine a margin length, based on a difference between the image and the first preview image; and determine the unit length, based on the margin length.

* * * * *